Feb. 10, 1931.  J. A. MILLER  1,792,464
OIL MEASURING DEVICE
Filed Aug. 17, 1928

Inventor.
Joseph A. Miller
by Heard Smith & Tennant.
Attys.

Patented Feb. 10, 1931

1,792,464

UNITED STATES PATENT OFFICE

JOSEPH ALBERT MILLER, OF HOPEDALE, MASSACHUSETTS, ASSIGNOR TO DRAPER CORPORATION, OF HOPEDALE, MASSACHUSETTS, A CORPORATION OF MASSACHUSETTS

OIL-MEASURING DEVICE

Application filed August 17, 1928. Serial No. 300,363.

This invention presents a device for supplying a measured quantity of liquid and it is particularly designed for supplying such a quantity of liquid through an orifice of an otherwise closed vessel. Still more particularly the invention has for its object to supply a measured quantity of oil to the bolster case of a textile spindle bearing.

With a type of spindle bearing coming into use, it is very important before the spindle is introduced into the bearing to place in the bearing a definite measured quantity of lubricating oil. The present invention is particularly designed for that purpose, although it is applicable to a wider range of use.

A further object of the invention is to provide such a device which may be inserted in the upper end of the bolster casing of the spindle bearing. The ordinary bolster casing is a closed vessel except for the orifice at the upper end into which the spindle and its bearing are introduced. In supplying a liquid such as lubricating oil from a device thus inserted in the orifice of an otherwise closed vessel, means must be provided to allow the liquid or oil to flow freely from the device into the vessel and to allow the air displaced in the vessel to escape through the orifice. These results are accomplished by the present invention.

The nature and objects of the invention will appear more fully from the accompanying description and drawings and will be fully pointed out in the claims.

The drawings illustrate a simple and preferred form of device embodying the invention particularly designed for supplying a measured quantity of lubricating oil to the bolster casing of a textile spindle.

Figure 1:
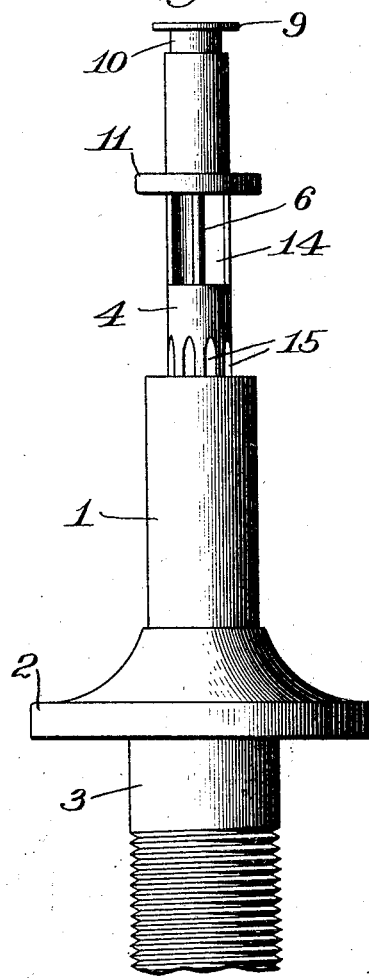
Fig. 1 is a side elevation of the upper portion of an ordinary type of bolster casing with a device of the invention in place therein.
Figure 2:
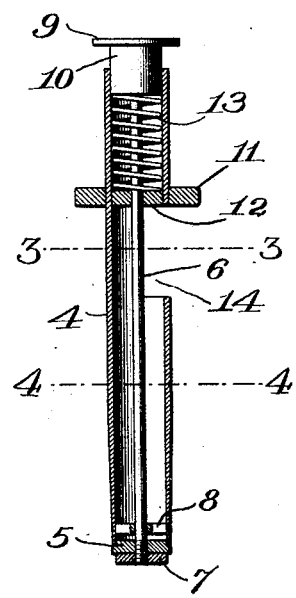
Fig. 2 is a view in longitudinal cross section of the measuring device.
Figure 3:
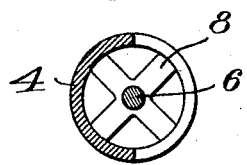
Fig. 3 is a view in transverse cross section taken on the line 3—3 of Fig. 2.
Figure 4:
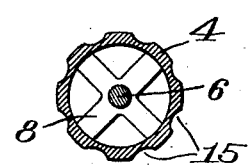
Fig. 4 is a view in transverse cross section taken on the line 4—4 of Fig. 2.

A bolster casing 1 having a flange 2 to rest upon a spindle supporting rail and a socket portion 3 closed at its lower end, but shown broken away in Fig. 1, all of a familiar and usual type, is shown as an illustration of the use to which this invention is primarily to be put. Such a bolster casing contains the bearing and the lower end of the spindle of a textile spinning and constitutes a vessel closed except for the circular orifice at its upper end into which the bearing and the spindle are inserted. As already pointed out, it is essential in certain types of such apparatus to insert a definite measured quantity of lubricating oil into the bolster casing in order that the spindle and its bearing may be properly lubricated.

The device of this invention in the preferred form shown comprises a generally cylindrical casing 4 tapering slightly toward its lower end and of a size such that it will fit snugly into the orifice at the upper end of the bolster casing. This casing 4 has at its lower end an opening of substantially the full internal area of said end closed by a disk-like valve 5. This valve is secured to the lower end of a plunger rod 6 which extends up through the casing 4 and is held on the plunger rod by a suitable nut 7 threaded thereon. Preferably the plunger rod at the lower end of the casing is guided in a spider 8 secured in the casing. At its upper end the plunger rod 6 is provided with a handle in the form of a thumb-piece 9 having a section 10 sliding in the extreme upper end of the casing 4. Below the head or thumb-piece the casing 4 is provided with a radially projecting finger-gripping flange 11. Within the casing and in line with the flange 11 a guide block 12 is mounted through which the plunger rod 6 slides and a helical spring 13 is seated between the section 10 of the plunger head and this block 12 and normally acts to elevate the plunger and thus maintain the valve 5 in closed position.

The casing 4 beneath the flange 11 is provided at one side with a cut-away portion 14 forming an opening both for filling the casing with oil and for permitting air to enter the casing and facilitate the discharge of the oil from the lower end of the casing. It will thus be seen that the amount of oil or other liquid contained in and delivered by the measuring device is determined by filling the lower portion of the casing 4 up to the level of the opening 14 or to any predetermined distance below said opening.

When the device is used, as in the case illustrated, for delivering the measured quantity contained within it into the upper end of a bolster casing, or, in other words, into the orifice of an otherwise closed vessel, it is necessary that the air displaced in the bolster casing or other vessel by the entering oil or liquid shall be free to pass out. This result is secured by forming the exterior wall of the casing 4 beneath the opening 14 with longitudinal grooves 15.

In using the device, the operator first fills the casing 4 with oil up to the level of the opening 14, or to within a predetermined distance thereof. He then inserts the device into the upper end of the casing 1, as shown in Fig. 1. The taper of the device and the grooves 15 are so proportioned that with the device in this position, the grooves 15 extend above the upper end of the bolster casing. He then places two fingers under the flange 12 and presses his thumb upon the plunger head 9, thus depressing the plunger against the action of the spring 13, opening the valve 5 and allowing the measured quantity of oil to flow into the bolster casing. The oil passes immediately into the bolster casing because the displaced air in the bolster casing passes out through the grooves 15 and air follows the oil through the opening 14 into the casing 4. The casing may then be lifted by the flange out of the bolster casing while the valve is held in open position by the thumb, thus insuring the transfer of all the measured quantity of oil from the device to the chamber of the bolster casing.

There is thus provided a very simple, efficient and practical device for supplying a measured quantity of liquid particularly through the orifice of an otherwise closed vessel.

Having thus described the invention, what is claimed as new, and desired to be secured by Letters Patent, is:

1. A device for supplying a measured quantity of liquid through an orifice of an otherwise closed vessel comprising a casing to project through and fit the orifice and having an air admission opening above the liquid and longitudinal grooves on its exterior to permit the egress of air from the vessel, a valve on the lower end of the casing and means for opening and closing the valve.

2. A device having the construction defined in claim 1, in which the portion of the casing containing the grooves tapers toward its lower end to enable it to fit the orifice snugly.

3. A device for supplying a measured quantity of liquid through an orifice of an otherwise closed vessel comprising a casing to project through and fit the orifice and having an air admission opening above the liquid and longitudinal grooves on its exterior to permit the egress of air from the vessel, a spring-closed valve on the lower end of the casing and a plunger extending from the valve through the casing for opening the valve.

4. A device for supplying a measured quantity of liquid through an orifice of an otherwise closed vessel comprising a cylindrical exteriorly and longitudinally grooved casing adapted to be inserted in said orifice and having at its lower end an opening of substantially the full internal area of said end, and having a filling and air admission opening near its upper end, a valve in the lower end of the casing, a plunger rod extending from the valve to the upper end of the casing, a spring acting to close the valve, and a handle on the plunger rod for depressing the valve rod to open the valve.

5. A device having the construction defined in claim 3, in which the upper end of the casing is of larger diameter than said orifice and the longitudinally grooved portion of the casing tapers slightly toward the lower end to permit the insertion of a part of said grooved portion into said orifice.

In testimony whereof, I have signed my name to this specification.

JOSEPH ALBERT MILLER.